US012809555B2

(12) United States Patent
Benisty

(10) Patent No.: US 12,809,555 B2
(45) Date of Patent: Nov. 24, 2026

(54) POWER CONSUMPTION FAIRNESS IN MULTI-HOST SYSTEM

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 40 days.

(21) Appl. No.: 19/003,904

(22) Filed: Dec. 27, 2024

(65) Prior Publication Data

US 2026/0186705 A1 Jul. 2, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0683* (2013.01)

(58) Field of Classification Search
CPC ..... G06F 3/0659; G06F 3/0604; G06F 3/0631
See application file for complete search history.

(56) References Cited

U.S. PATENT DOCUMENTS 9,418,712 B1 8/2016 Erez
10,866,740 B2 12/2020 Benisty et al.
11,880,256 B2 1/2024 Muthiah
2016/0370841 A1 12/2016 Erez
2020/0104056 A1 * 4/2020 Benisty ................ G06F 3/0688
2020/0209944 A1 7/2020 Palmer
2021/0109587 A1 4/2021 Mukker et al.
2023/0393877 A1 12/2023 Maroney
2024/0086086 A1 3/2024 Shin et al.

OTHER PUBLICATIONS

U.S. Appl. No. 15/810,632, filed Nov. 13, 2017.
U.S. Appl. No. 18/363,131, filed Aug. 1, 2023.

* cited by examiner

*Primary Examiner* — Nicholas A. Paperno
(74) *Attorney, Agent, or Firm* — Patterson + Sheridan, LLP

(57) ABSTRACT

Rather than allocating bandwidth to various host devices or functions in a multi-device system based upon the amount of data transferred, the bandwidth is allocated based upon the power consumed to execute a command. While two different commands may transfer an equal amount of data, the two different commands may consume different amounts of power. For example, one command may involve utilizing encryption while the other command may not use encryption. Utilizing encryption involves using more power than when encryption is not utilized. By considering power consumption on a per command basis, bandwidth allocation can be fair to ensure quality of service (QoS) is high.

19 Claims, 6 Drawing Sheets

POWER CONSUMPTION FAIRNESS IN MULTI-HOST SYSTEM

BACKGROUND OF THE DISCLOSURE

Field of the Disclosure

Embodiments of the present disclosure generally relate to improving bandwidth allocation in solid state drives (SSDs).

Description of the Related Art

Quality of Service (QoS) is a parameter in a multi-user system, offering device bandwidth administrators the ability to ensure throughput applications, thereby enabling transactions to be processed within an acceptable timeframe. QoS delivers several key benefits including granting devices control over bandwidth resources with the ability to manage the network using different priorities and bandwidth allocations for each user. Managing bandwidth allocation not only guarantees that time-sensitive and mission-critical applications receive the necessary resources, but also allows other applications access to the media. The overall result is an enhanced user experience and reduced costs achieved through efficient utilization of existing resources.

In a non-volatile memory (NVM) express (NVMe) multi-host environment with dozens of host applications, a QoS and fairness algorithm is utilized. The algorithm causes fairness in the system by ensuring that each host application receives an equitable share of resources and performance. By implementing an effective QoS and fairness algorithm, the NVMe storage system can optimize resource utilization, prevent contention issues, and deliver a balanced and reliable performance across diverse host applications. The algorithm assumes that transferring the same number of bytes consumes uniform resources and power, which is only true for very specific workloads.

There is a need in the art for improving bandwidth allocation in SSDs.

SUMMARY OF THE DISCLOSURE

Rather than allocating bandwidth to various host devices or functions in a multi-device system based upon the amount of data transferred, the bandwidth is allocated based upon the power consumed to execute a command. While two different commands may transfer an equal amount of data, the two different commands may consume different amounts of power. For example, one command may involve utilizing encryption while the other command may not use encryption. Utilizing encryption involves using more power than when encryption is not utilized. By considering power consumption on a per command basis, bandwidth allocation can be fair to ensure quality of service (QoS) is high.

In one embodiment, a data storage device comprises: a memory device; and a controller coupled to the memory device, wherein the controller is configured to: fetch a first command from a first location; evaluate expected power usage for the first command; determine whether the first location has sufficient credits for the first command to be executed; and either: execute the first command immediately; or hold the first command, wait for sufficient credits to be allocated for the first command to be executed, and execute the first command after the waiting.

In another embodiment, a data storage device comprises: a memory device; and a controller coupled to the memory device, wherein the controller comprises a fairness control module and wherein the fairness control module is configured to: fetch one or more commands from one or more submission queues (SQs) with an arbiter; maintain a power consumption database; determine power allocation for the one or more commands based upon information from the power consumption database; and determine whether to execute the one or more commands or delay execution of the one or more commands.

In another embodiment, a data storage device comprises: means for storing data; and a controller coupled to the means for storing data, wherein the controller is configured to: execute a first command transferring a first plurality of bytes to the means for storing data using a first set of parameters and consuming a first amount of power; execute a second command transferring a second plurality of bytes to the means for storing data using a second set of parameters and consuming a second amount of power, wherein the first plurality is equal to the second plurality, wherein the first set of parameters is different than the second set of parameters, and wherein the first amount is less than the second amount; and determine when to execute the first command and the second command based upon power consumption credits allocated relative to the first amount and the second amount.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than allocating bandwidth to various host devices or functions in a multi-device system based upon the amount of data transferred, the bandwidth is allocated based upon the power consumed to execute a command. While two different commands may transfer an equal amount of data, the two different commands may consume different amounts of power. For example, one command may involve utilizing encryption while the other command may not use encryption. Utilizing encryption involves using more power than when encryption is not utilized. By considering power consumption on a per command basis, bandwidth allocation can be fair to ensure quality of service (QoS) is high.

The instant disclosure tackles the QoS and fairness challenges in a multi-host environment by introducing a method that offers several advantages over previous approaches. The embodiments are generally related to a system having multiple hosts, but are also applicable for a system that has a single host with some sub clients under the host such as virtual functions. The motivation is to have a QoS and fairness among those functions and/or hosts.

Figure 1:
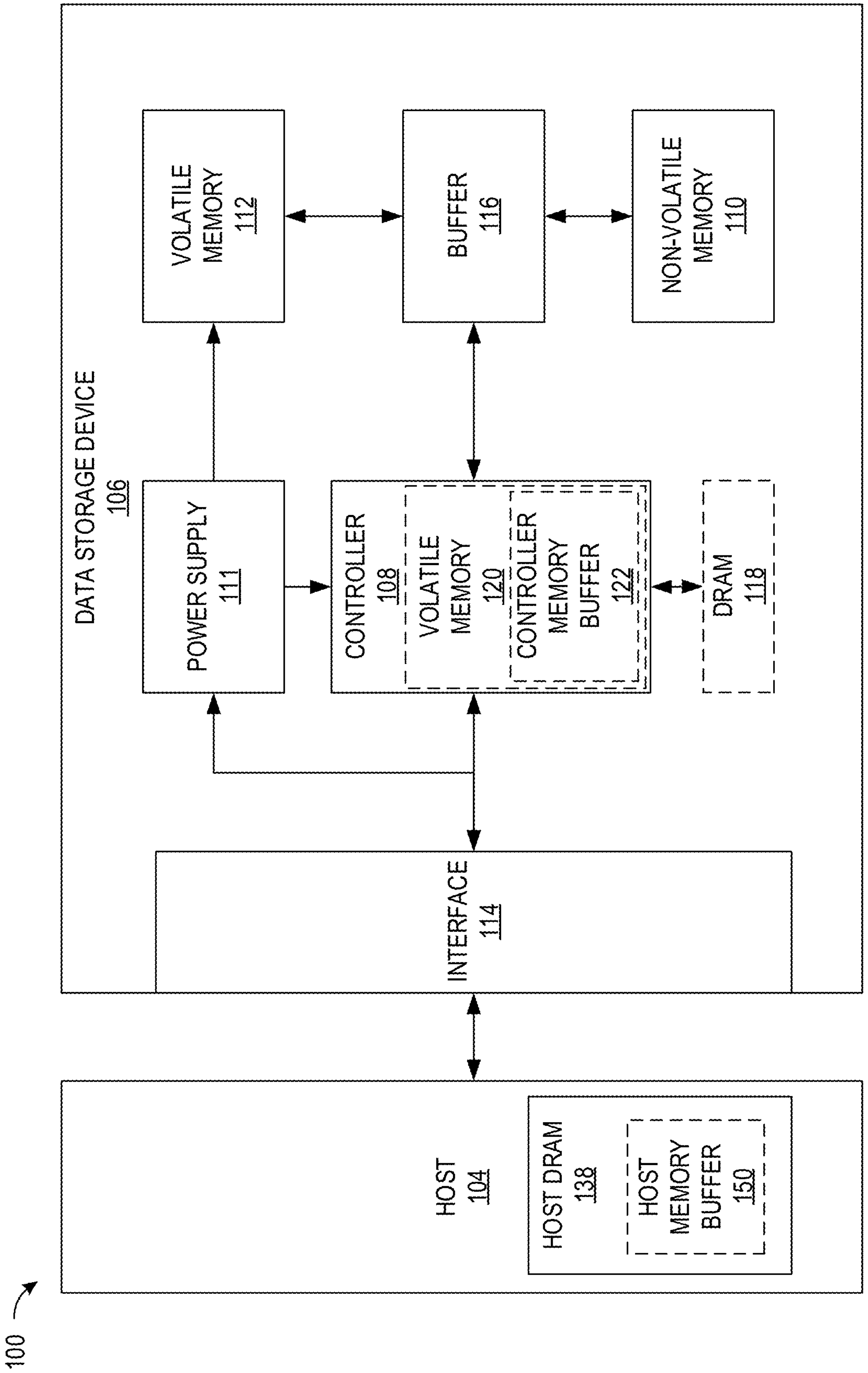
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
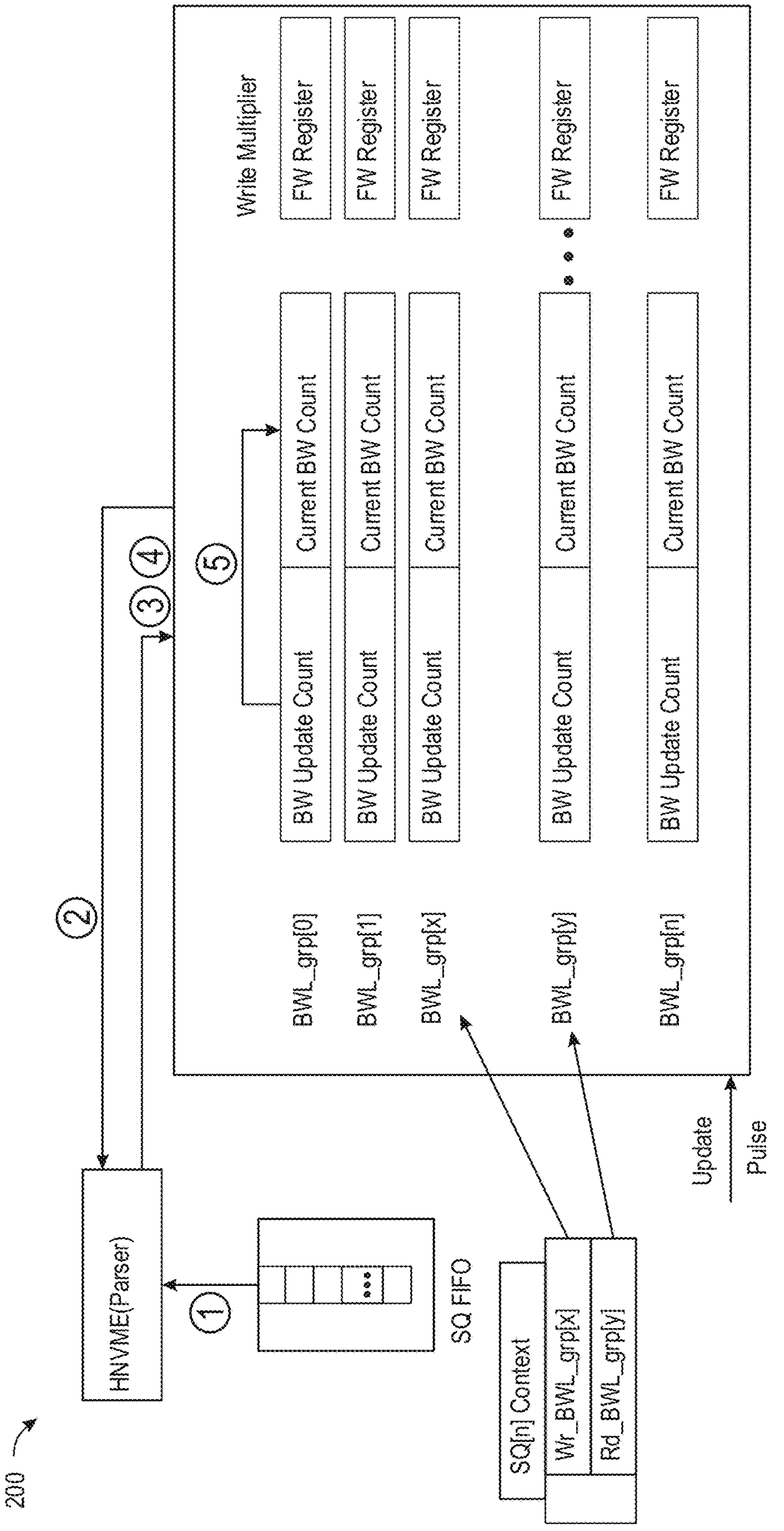
FIG. 2 is a schematic diagram illustrating a bandwidth limiter, according to certain embodiments.

The previous approach relied on fairness in performance, or the number of bytes transferred within a fixed period. FIG. 2 illustrates the core concept of the algorithm. FIG. 2 is a schematic diagram illustrating a bandwidth limiter 200, according to certain embodiments. Upon receiving a command, the command is associated with the corresponding bandwidth limiter vector, and the current bandwidth limiter counter is decremented based on the command's size. If the counter falls below the low-level threshold, the relevant submission queue (SQ) identification (ID) is disabled for subsequent fetching operations until the bandwidth allows fetching.

Periodically, the logic scans the bandwidth limiter groups and allocates bandwidth for each of them. Upon crossing the high-level threshold of the counter, all previously disabled SQ IDs associated with the vector are re-enabled.

The primary limitation of the approach lies in the accuracy. The underlying assumption in the concept of FIG. 2 is that transferring X bytes consumes uniform resources and power. However, the assumption proves inaccurate, as the assumption depends on various parameters like encryption/decryption, CMB, LDPC decoder operation specific to each command, and more. The algorithm fails to account for diverse data-path configurations that can vary from command to command. Consequently, the approach only guarantees bandwidth for very specific workloads.

FIG. 2 illustrates the bandwidth limited concept where all the fairness is based on performance. The performance is measured for each and every function or virtual function or physical function that is in system. There is a performance requirement for each and every function and the controller will make sure that the performance for each function will not exceed the requirement. For example, if for host number one the target is one gigabyte per second, the algorithm will measure the performance. If the algorithm determines that a command for host number one will exceed the one gigabyte max performance, the controller will perform some mechanism of command throttling so that no more commands will be fetched from host one until there are sufficient credits. If there are not sufficient credits, then the specific host already has the maximum performance and thus will need to wait to execute the command until more time passes and host one has sufficient credits and only then will the command be fetched for host one.

The credit system used in FIG. 2 does not have to be associated with one host, but is applicable to multiple hosts grouped together. The controller will make sure the group will not exceed the one gigabyte performance in total for all members of the group. Any hosts or functions that are associated with the specific group would have bandwidth allocated based on performance. The controller would measure the performance and make sure by having the performance or by limiting the performance that there is fairness in the system.

As noted above, there is a problem in that even if the controller makes sure the performance, for each and every host is allocated up to one gigabyte per second, assuming four hosts for example, the fairness that appears to be present is not really present. Fairness is not present because, for example, the first host could have a different workload compared to the other hosts. For example, the first host may have a random read workload. The random read workload would utilize more power in order to complete the tasks compared to a sequential read workload. Even if the performance for random and sequential reads is the same compared to the other hosts, from a power perspective, fairness is not present even though the performance is the same. More power is needed for the first host with the random read in order to achieve the same performance as the sequential reads for the other hosts.

As another example, all hosts could have the same workload, for example sequential read, but for host one the bit error rate (BER) is very high. To achieve the same performance for all hosts, host one will need more power to achieve that same performance due to the high BER. As another example, perhaps encryption/decryption is enabled for one of the hosts and not other hosts. Due to the encryption/decryption enabling, more power will be needed in order to obtain the same performance. Therefore, performance is not always a good criteria to compare.

The disclosure involves a novel approach to address the fairness challenge in a multi-host storage device. Instead of relying on a fairness algorithm based on performance and quality of service, the idea is to implement fairness in power allocation among multiple hosts. The proposal introduces a credit-based power scheduler that ensures fairness based on the actual power consumed by each host per operation. The approach is more accurate than previous methods, as fairness in performance does not necessarily guarantee fairness in the overall system. Various parameters in the data path can lead to diverse shared resource requirements and power consumptions. By basing fairness on power consumption, the method becomes more accurate and applicable to a wide range of workloads and applications.

The multi-host environment can take various forms, including: PCIe multi-ports—involving several PCIe links connected to multiple hosts; multiple physical functions sharing the same link (multi-PF); multiple virtual functions sharing the same link (SR-IOV); multiple NVMe namespaces; multiple submission queues; and multiple endurance groups. The multi-host options are merely examples as other possibilities are contemplated.

The power consumption in SSDs per command is influenced by various factors, including the optional pipeline stages such as DRAM, CMB, encryption and decryption operations, and low density parity check (LDPC) decoder modes. Below is a breakdown of how each stage can impact power consumption.

For DRAM, in the read path, power is consumed when data is fetched from the NAND flash memory and loaded into DRAM. The energy required for DRAM read operations contributes to the overall power consumption per read command. In the write path, power is consumed when data from the host is temporarily stored in DRAM before being programmed into the NAND flash memory. DRAM write operations contribute to the power consumption per write command. More specifically, there might be a path that utilizes DRAM as part of the data path, and thus will require more power in order to have the same transfer performance as paths that do not utilize DRAM.

For CMB, in the read path, if CMB is used to cache frequently accessed data, the energy required for CMB read operations adds to the power consumption per read command. In the write path, utilizing CMB as a buffer for frequently accessed data incurs power consumption during CMB write operations, contributing to the overall power usage per write command. More specifically for CMB, if CMB is enabled for a specific command, using the CMB will require more performance because the data will be copied. Usually the CMB is implemented in DRAM and therefore will require more effort, more power consumption.

For encryption and decryption operations, in the read path, if data is encrypted on the NAND flash and needs decryption during a read operation, the energy consumed during the decryption process contributes to the power consumption per read command. In the write path, if encryption is enabled for data from the host during a write operation, the power consumed during the encryption process adds to the overall power usage per write command. More specifically, encryption/decryption may be enabled and utilize more power than when encryption/decryption is disabled.

For LDPC decoder/encoder modes, in the read path, LDPC decoding contributes to the power consumption per read command. The consumed power depends on the actual BER. In the write path, LDPC encoding, used to add error correction codes during a write operation, adds to the power consumption per write command. More specifically, if LDPC is enabled due to a high BER, the controller will need to use more power, more effort in order to complete a task.

For RAID protection, in the read path, in RAID configurations, especially those with parity-based RAID levels, such as RAID 5 or RAID 6, additional computations are involved in checking and reconstructing data from parity information during read operations. These computations, which are part of the RAID protection scheme, contribute to increased power consumption per read command. In the write path, during write operations in RAID configurations, parity updates or calculations may be necessary. More specifically, if RAID is enabled, using RAID will require more power, more effort to complete a task compared to when RAID is not enabled.

So again, the idea is to not have the fairness algorithm be based on performance, but to be based on power which will lead to better and accurate results from a fairness point of view.

In summary, each optional pipeline stage in the data path of SSDs introduces additional power consumption per command. The specific impact varies based on the SSD's architecture, features, and the utilization of these optional stages during read and write operations. Basing the fairness algorithm just on performance is not a good metric as performance for one host may consume X power while the same performance may consume Y power for a different host while X≠Y.

Stated another way, the idea is not to compare the performance in order to achieve fairness, but to have fairness in power allocation because power allocation would be more accurate from a fairness point of view. A determination is made regarding how much time in the effort needs to be spent in order to complete the task. The idea is to have fairness in power, in power consumption, and power allocation.

Figure 3:
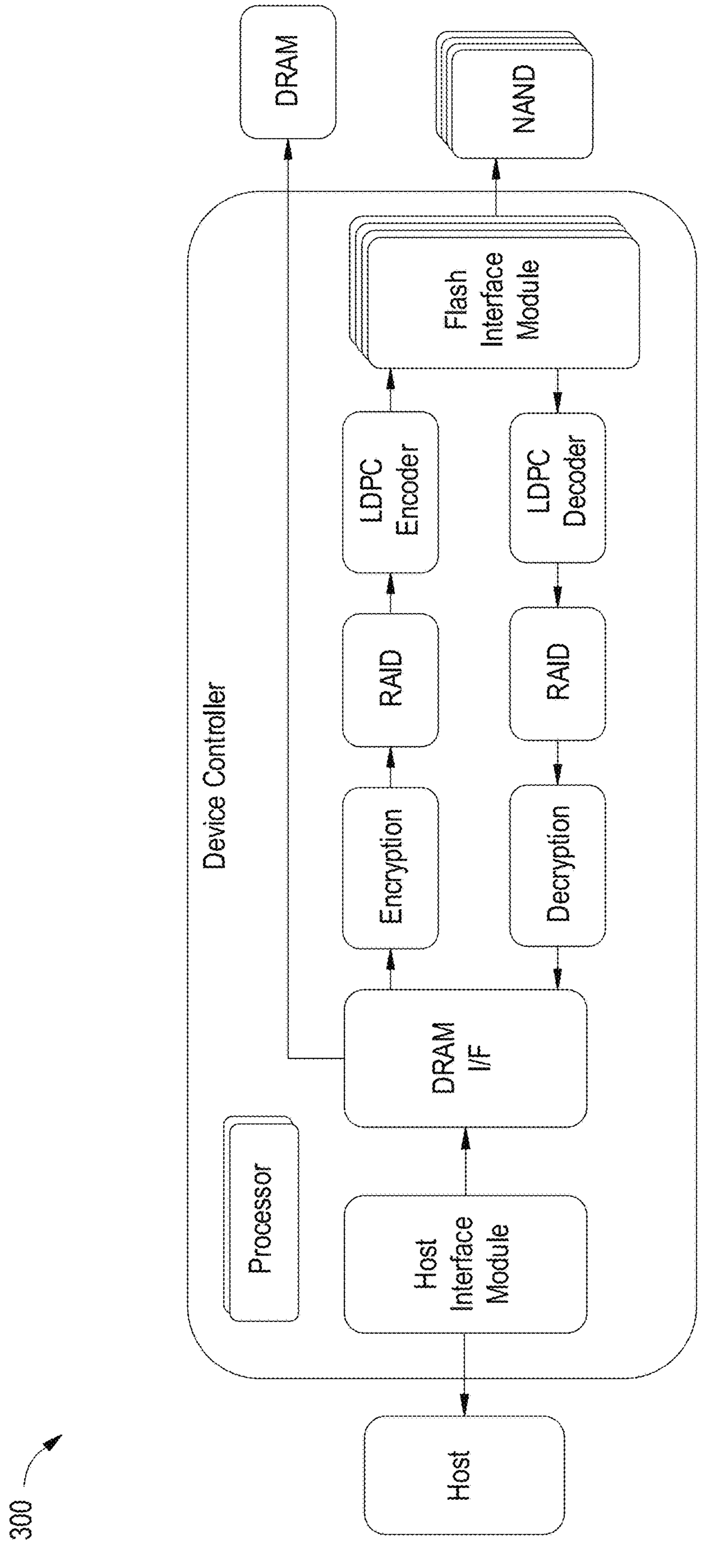
FIG. 3 is a schematic diagram illustrating the storage device focusing on the data path components according to one embodiment.

FIG. 3 illustrates the high-level block diagram of the storage device while focusing on the data-path components. Additionally, the optional components are colored. A basic read/write data transfer utilizes the host interface, the NAND interface and the LDPC. However, there are some additional operations as part of the data path that are optional and depend on host requirements and might be per command. The operations include the work with the DRAM, security operations, RAID protection, etc. LDPC decoder supports several modes depending on the BER while each mode consumes different power. The power consumption of a command depends on the selected operations and is not fixed.

The system 300 includes the LDPC encoder module, RAID module on the write path, encryption module on the write path, decryption module on the read path, LDPC decoder module on the read path, and the RAID module on the read path. Depending on the command, any of the modules can be bypassed or disabled which changes the power consumption.

Figure 4:
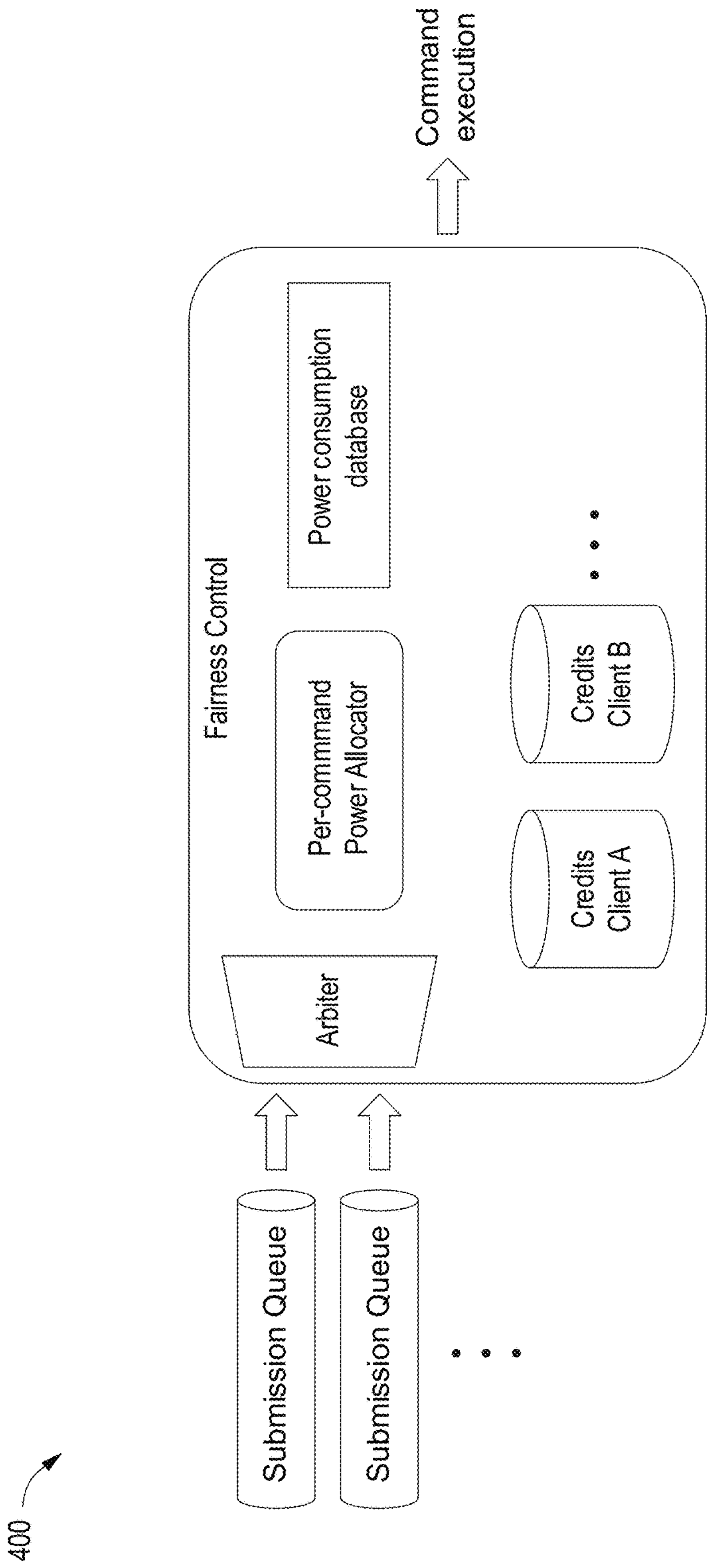
FIG. 4 is a schematic diagram illustrating the power fairness control according to one embodiment.

FIG. 4 depicts the concept of achieving power fairness in the system. The system 400 includes an arbiter module, a per command power allocator module a power consumption database, and one or more credit collection modules where the number of credit collection modules is equal to or greater than the number of SQs (as shown in FIG. 4), host devices, virtual functions, or physical functions.

Commands are selected from SQs based on the availability of power credits. The arbiter, responsible for determining the next SQ to be processed, monitors the available credits per client. The per-command power allocator then allocates power for each command, considering the specific data path required for that command. Credits are consumed accordingly. The power consumption database is referenced to define the number of credits needed for each operation.

For example, if there are several SQs, the arbiter will decide from which SQ the next command will be fetched. The command is fetched and then the per command power allocator determines whether the command can be completed. For example, if the fetched command is a read command, the controller first evaluates what power would be needed by consulting the power consumption database. Based on the information obtained from the power consumption database, the per-command power allocator will be able to decide whether the command can be completed. The information obtained from the power consumption database may include the size of the command, whether encryption/decryption is enabled or disabled, and other parameters. The power allocator will go over all the parameters to see what is needed in order to complete the command and then will calculate the power required in order to complete the command.

The system is also based on credits and will consume the credits from the relevant client. The credits in this case correlate to power, such as power credits. The power required will equal a number of credits (i.e., power credits). If the SQ has sufficient credits (i.e., power credits) allocated to the SQ, then the command can be executed. If there is an insufficient amount of credits, the command will not be executed until sufficient credits are available, except as noted below.

For example, if SQ A is associated with client A and will consume the credits from the client, then if there is not sufficient credit, the controller will not fetch the next command from SQ A. Instead, the controller will wait sometime until SQ A has enough credits and then would fetch the next command from SQ A. Thus, the controller achieves fairness by throttling the command fetching.

The table below shows the power consumption database. The database holds the power credits that should be consumed for each data-path operation as a function of the operation mode. Operation mode holds several parameters like the clock frequencies and power mode. For each command, the required data-path is defined, and the required power is calculated accordingly.

TABLE

| Subsystem | Operation | Mode A | Mode B | Mode C | . . . |
|---|---|---|---|---|---|
| NAND | NAND sense | 20 | | | |
| | NAND 4KB transfer | 5 | | | |
| | NAND 16KB transfer | 19 | | | |
| | NAND program | 30 | | | |
| | . . . | | | | |
| | . . . | | | | |
| DRAM | Read L2P | 2 | | | |
| | Write L2P | 4 | | | |
| | 4K read | 5 | | | |
| | 4K write | 5 | | | |
| | . . . | | | | |
| | . . . | | | | |
| LDPC | Encoding | 4 | | | |
| | Decoding ultra-low power mode | 4 | | | |
| | Decoding low-power mode | 5 | | | |
| | Decoding full-power mode | 7 | | | |
| | . . . | | | | |
| | . . . | | | | |
| Security | Encryption | 3 | | | |
| | Decryption | 3 | | | |
| | . . . | | | | |
| | . . . | | | | |
| RAID Protection | RAID 5 encoding | 4 | | | |
| | RAID 6 encoding | 5 | | | |
| | . . . | | | | |
| | . . . | | | | |

It is to be noted that the subsystem, operation, and modes in the Table are merely for example. Additional subsystems, operations, and modes are contemplated.

Regarding the Table, consider, for example, the NAND. The power required for a NAND sense depends on several other parameters, such as the clock frequency, the host, the toggle mode, etc. Additionally, for example, if DRAM or LDPC is used or not. The controller will sum up all the numbers for the command and see if there is sufficient credits to execute the command. If there is insufficient credits, the command will not be executed as the controller will wait for more credits. Otherwise, the controller will consume the credits and execute the command. In so doing, the mechanism achieves fairness based on power.

Stated another way, the controller will add up the total for a host and if there are sufficient credits, the controller will execute that command. Otherwise, the controller wait until sufficient credits are available to execute the command. Note that the totaling is on a command basis. Initially, after receiving the command, the command is parsed and then the calculation occurs to obtain the power required in order to complete the command.

In one embodiment, one client may consume more than the allowed power when other clients are inactivated. More specifically, the controller may decide to execute a command even if there is not sufficient credits based on the activity. The controller can execute the command even if there is insufficient credits because there may be another host that is in the idle state and thus does not need bandwidth at that time. Thus, the controller may decide to allow the execution of the command even if for a specific group that does not have sufficient credits by allowing the host to borrow credits from an idle host.

In yet other embodiments, prediction logic could be incorporated that predicts when a client would be idle or less stressed and the power may be allocated for other clients. For example, the logic can predict what will be the workload one second from now and based upon the predicted workload, adapt the system.

Figure 5:
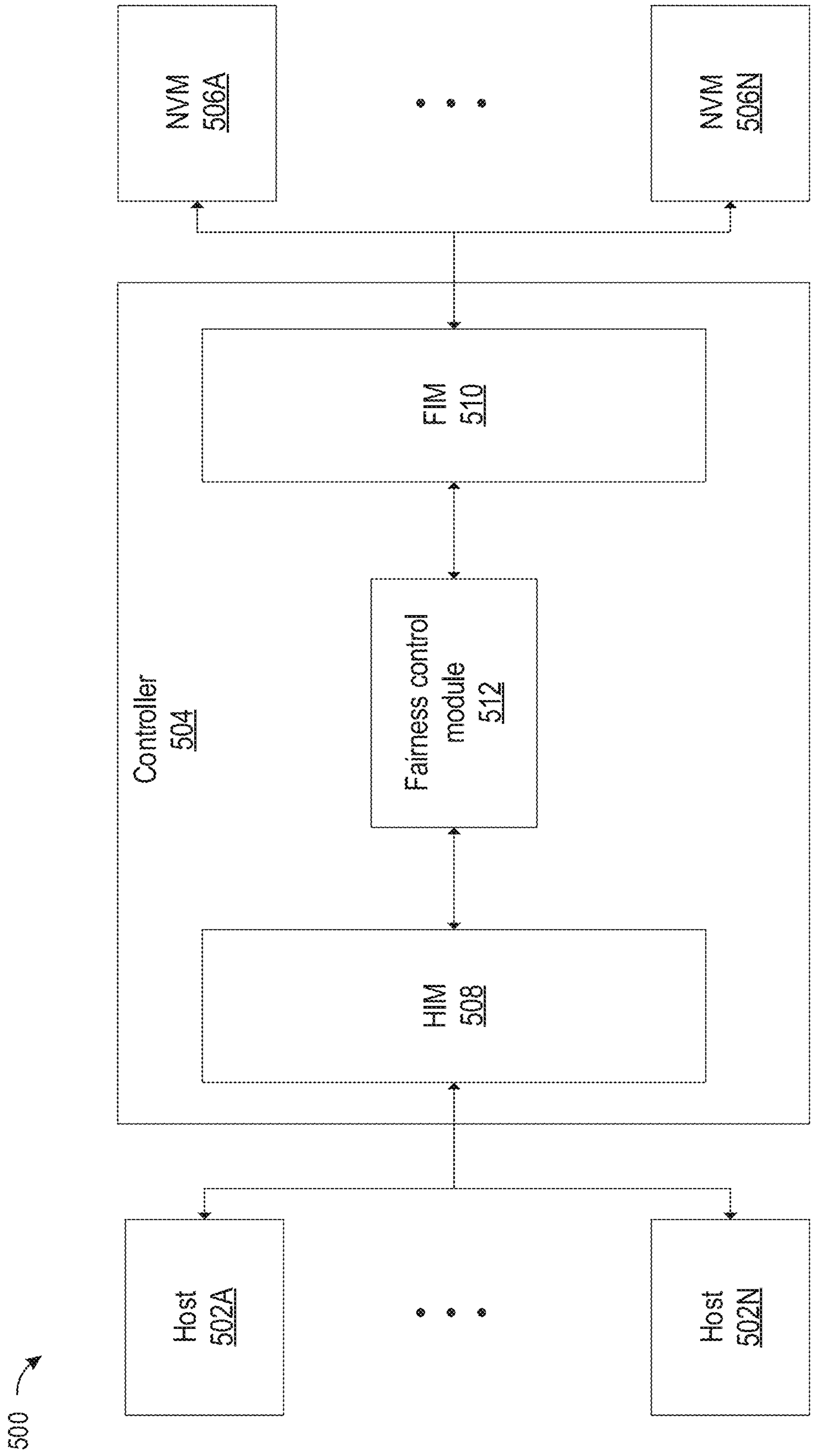
FIG. 5 is a schematic illustration of a system incorporating a fairness control module according to one embodiment.

FIG. 5 is a schematic illustration of a system 500 incorporating a fairness control module according to one embodiment. The system includes a plurality of host devices 502A-502N. It is to be understood that while two host devices are shown, a single host device is contemplated as are a plurality of host devices. Similarly, the host devices 502A-502N may be actual, physical host devices, physical functions, virtual functions, or combinations thereof. For example, the host devices 502A-502N could be a single host device having a plurality of virtual functions, a plurality of physical functions, or a mixture of the two. Similarly, the host devices 502A-502N could be a plurality of physical devices.

The system 500 also includes one or more NVMs 506A-506N and a controller 504. The controller 504 is coupled to the host devices 502A-502N via a host interface module (HIM) 508 and the NVMs 506 are coupled to the controller via a flash interface module (FIM) 510. The HIM 508 and FIM 510 are coupled to a fairness control module 512 such as the fairness control module shown in FIG. 4.

Figure 6:
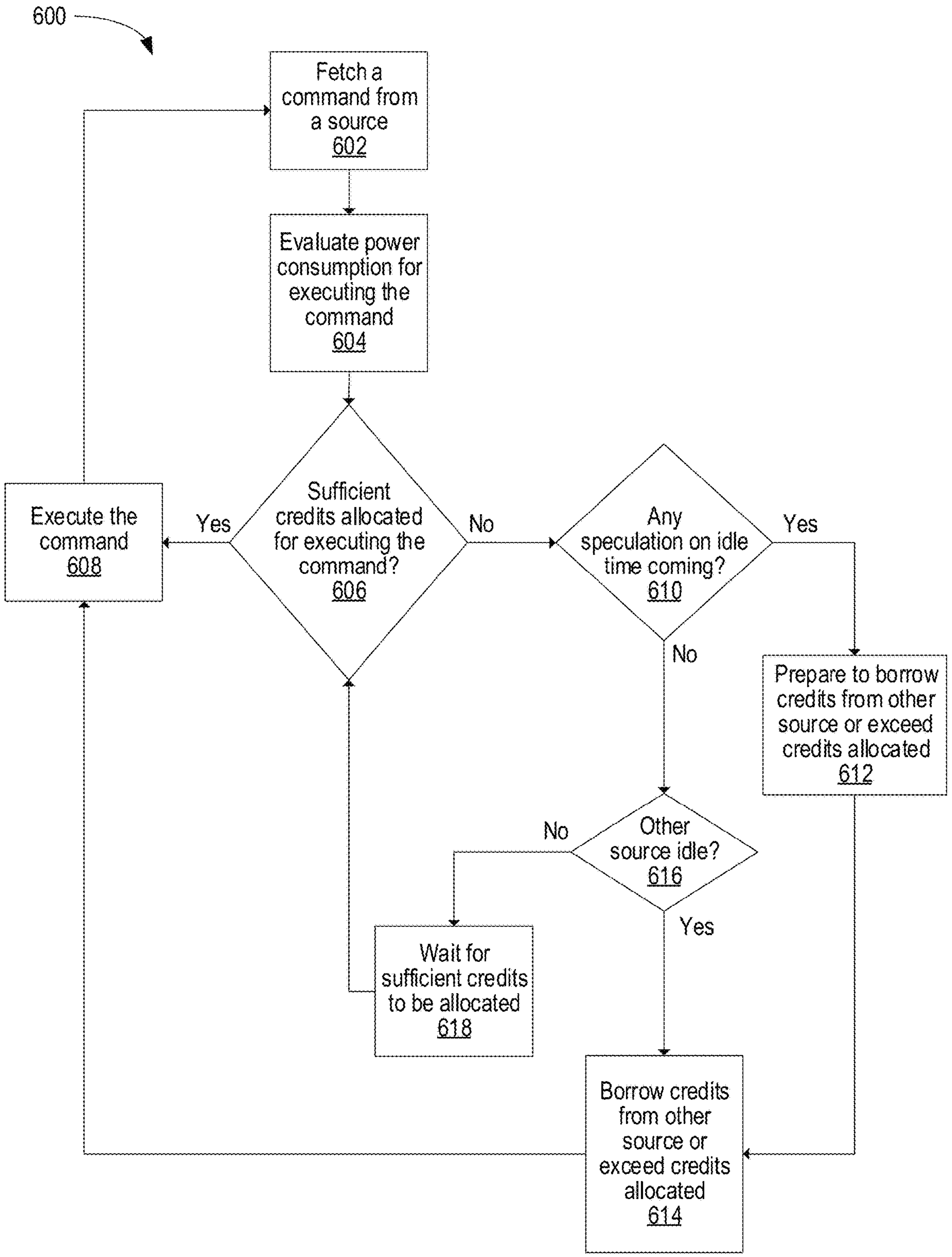
FIG. 6 is a flowchart illustrating a method of bandwidth allocation according to one embodiment.

FIG. 6 is a flowchart 600 illustrating a method of bandwidth allocation according to one embodiment. Initially, a command is fetched from a source at block 602. The source could be a host, a virtual function, or a physical function for example. Thereafter, the power consumption for executing the command is evaluated at block 604. The evaluation occurs by consulting the power consumption database. Upon determining the power consumption, the controller determines whether there are sufficient credits allocated to the host, virtual function or physical function to execute the command at block 606. If there are enough credits, the command is simply executed at block 608 and the process is repeated beginning at block 602.

If there are not enough credits, then a determination is made at block 610 regarding whether any idle time can be predicted for any other host, virtual function, or physical function, which is allocated credits. If there are any hosts, virtual functions, or physical functions that are predicted to be idle soon, then the controller prepares to borrow credits from the idle host virtual function or physical function at block 612 or simply allows the host device, virtual function, or physical function to exceed allocated credits. Thereafter, the host, virtual function, or physical function borrows or exceeds the allocated credits at block 614 and executes the command at block 608.

If there is no prediction at block 610, then a determination is made regarding whether there are any hosts, virtual functions, or physical functions are currently idle at block 616. If there is at least one host, virtual function, or physical function that is idle, then the process proceeds to block 614. Otherwise, the method proceeds to block 618 to wait for sufficient credits to be allocated followed by proceeding back to block 606. It is to be noted that blocks 610 and 616 may occur in any order and independent of one another. Additionally, credits are continuously allocated and maintained in the fairness control module.

The disclosure introduces a more efficient, adaptable, and equitable utilization of power resources across a multi-host environment, significantly enhancing overall system performance and sustainability compared to the previous approach that focused on performance fairness. By ensuring fair power distribution among multiple hosts, the algorithm optimizes system performance while addressing issues of unfair resource utilization. The concept's adaptability to diverse workloads and data-path configurations enhances system flexibility, offering a dynamic approach to power allocation. The adaptability not only fosters balanced resource utilization but also contributes to improved energy efficiency, rendering the multi-host system more sustainable and cost-effective.

In one embodiment, a data storage device comprises: a memory device; and a controller coupled to the memory device, wherein the controller is configured to: fetch a first command from a first location; evaluate expected power usage for the first command; determine whether the first location has sufficient credits for the first command to be executed; and either: execute the first command immediately; or hold the first command, wait for sufficient credits to be allocated for the first command to be executed, and execute the first command after the waiting. A second command can be fetched from a second location in parallel to fetching the first command or after fetching the first command. Additionally, the second command can be executed in parallel to executing the first command, after executing the first command, or while waiting for sufficient credits to be available to execute the first command . . . all assuming there are sufficient credits to execute the second command. The controller is configured to allocate credits to the first location. The expected power usage corresponds to a number of credits. The executing occurs when the number of credits corresponding to the expected power usage is equal to or greater than a number of credits allocated to the first location. The executing occurs when a second location is idle, the first location borrows credits from the second location, and the number of credits corresponding to the expected power usage is equal to or less than a number of credits allocated to the first location and borrowed the second location combined. The controller is configured to: predict that a second location will be idle; allocate additional credits to the first location; and perform the executing of the first command. The first location and a second location each comprise a virtual function, a physical function, or combinations thereof. The evaluating and determining is performed by a fairness control module. The fairness control module comprises a per command power allocator module and an arbiter. The controller is configured to maintain a power consumption database comprising power credit information for data path operations as a function of operation mode.

In another embodiment, a data storage device comprises: a memory device; and a controller coupled to the memory device, wherein the controller comprises a fairness control module and wherein the fairness control module is configured to: fetch one or more commands from one or more submission queues (SQs) with an arbiter; maintain a power consumption database; determine power allocation for the one or more commands based upon information from the power consumption database; and determine whether to execute the one or more commands or delay execution of the one or more commands. Execution of a first command of the one or more commands is delayed when the power allocation for the first command of the one or more commands exceeds credits allocated to a corresponding SQ of the first command. The fairness control module includes a per command allocator module. The fairness control module is configured to allocate credits for the one or more SQs. The one or more SQs comprises a plurality of SQs and wherein each SQ of the plurality of SQs is disposed in a different physical function or virtual function.

In another embodiment, a data storage device comprises: means for storing data; and a controller coupled to the means for storing data, wherein the controller is configured to: execute a first command transferring a first plurality of bytes to the means for storing data using a first set of parameters and consuming a first amount of power; execute a second command transferring a second plurality of bytes to the means for storing data using a second set of parameters and consuming a second amount of power, wherein the first plurality is equal to the second plurality, wherein the first set of parameters is different than the second set of parameters, and wherein the first amount is less than the second amount; and determine when to execute the first command and the second command based upon power consumption credits allocated relative to the first amount and the second amount. The first command is fetched from a first function and the second command is fetched from a second function distinct from the first function. The controller is configured to permit either the first function or the second function to exceed credit allocation when another function is idle. The controller is configured to predict when a function will be idle and adjust power allocation based upon the predicting. The controller is configured to maintain a power consumption database and wherein the determining comprises obtaining the first amount and the second amount from the power consumption database.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
fetch a first command from a first location;
evaluate expected power usage for the first command wherein the expected power usage corresponds to a number of credits;
determine whether the first location has sufficient credits for the first command to be executed; and
either:
execute the first command immediately, wherein the executing occurs when a second location is idle, the first location borrows credits from the second location, and the number of credits corresponding to the expected power usage is equal to or less than a number of credits allocated to the first location and borrowed from the second location combined; or
hold the first command, wait for sufficient credits to be allocated for the first command to be executed, and execute the first command after the waiting.

2. A data storage device, comprising:
a memory device; and
a controller coupled to the memory device, wherein the controller is configured to:
fetch a first command from a first location;
evaluate expected power usage for the first command;
determine whether the first location has sufficient credits for the first command to be executed;
predict that a second location will be idle;
allocate additional credits to the first location; and
perform the executing of the first command, wherein the executing comprises either:
executing the first command immediately; or
holding the first command, wait for sufficient credits to be allocated for the first command to be executed, and execute the first command after the waiting.

3. The data storage device of claim 2, wherein the controller is configured to allocate credits to the first location.

4. The data storage device of claim 2, wherein the expected power usage corresponds to a number of credits.

5. The data storage device of claim 3, wherein the executing occurs when the number of credits corresponding to the expected power usage is equal to or greater than a number of credits allocated to the first location.

6. The data storage device of claim 2, wherein the first location and a second location each comprise a virtual function, a physical function, or combinations thereof.

7. The data storage device of claim 2, wherein the evaluating and determining is performed by a fairness control module.

8. The data storage device of claim 7, wherein the fairness control module comprises a per command power allocator module and an arbiter.

9. The data storage device of claim 2, wherein the controller is configured to maintain a power consumption database comprising power credit information for data path operations as a function of operation mode.

10. A data storage device, comprising:
a memory device; and
a controller coupled to the memory device, wherein the controller comprises a fairness control module and wherein the fairness control module is configured to:
fetch one or more commands from one or more submission queues (SQs) with an arbiter;
maintain a power consumption database;
determine power allocation for the one or more commands based upon information from the power consumption database;

determine whether a first location has sufficient credits for a first command to be executed;

predict that a second location will be idle;

allocate additional credits to the first location;

determine whether to execute the one or more commands or delay execution of the one or more commands; and perform the executing of the first command.

11. The data storage device of claim 10, wherein execution of the first command of the one or more commands is delayed when the power allocation for the first command of the one or more commands exceeds credits allocated to a corresponding SQ of the first command.

12. The data storage device of claim 10, wherein the fairness control module includes a per command allocator module.

13. The data storage device of claim 10, wherein the fairness control module is configured to allocate credits for the one or more SQs.

14. The data storage device of claim 10, wherein the one or more SQs comprises a plurality of SQs and wherein each SQ of the plurality of SQs is disposed in a different physical function or virtual function.

15. A data storage device, comprising:

means for storing data; and a controller coupled to the means for storing data, wherein the controller is configured to:

execute a first command transferring a first plurality of bytes to the means for storing data using a first set of parameters and consuming a first amount of power;

execute a second command transferring a second plurality of bytes to the means for storing data using a second set of parameters and consuming a second amount of power, wherein the first plurality is equal to the second plurality, wherein the first set of parameters is different than the second set of parameters, and wherein the first amount is less than the second amount; and determine when to execute the first command and the second command based upon power consumption credits allocated relative to the first amount and the second amount.

16. The data storage device of claim 15, wherein the first command is fetched from a first function and the second command is fetched from a second function distinct from the first function.

17. The data storage device of claim 16, wherein the controller is configured to permit either the first function or the second function to exceed credit allocation when another function is idle.

18. The data storage device of claim 17, wherein the controller is configured to predict when a function will be idle and adjust power allocation based upon the predicting.

19. The data storage device of claim 15, wherein the controller is configured to maintain a power consumption database and wherein the determining comprises obtaining the first amount and the second amount from the power consumption database.

* * * * *